H. F. BOBO & P. F. JOHNSON.
Bee-Hives.
No. 147,037.  Patented Feb. 3, 1874.
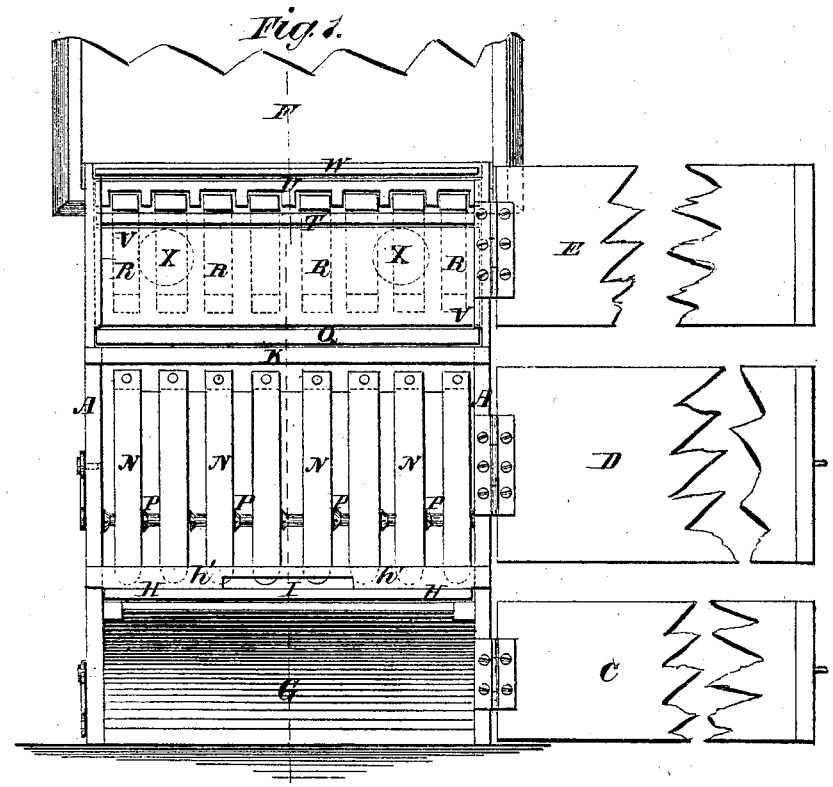
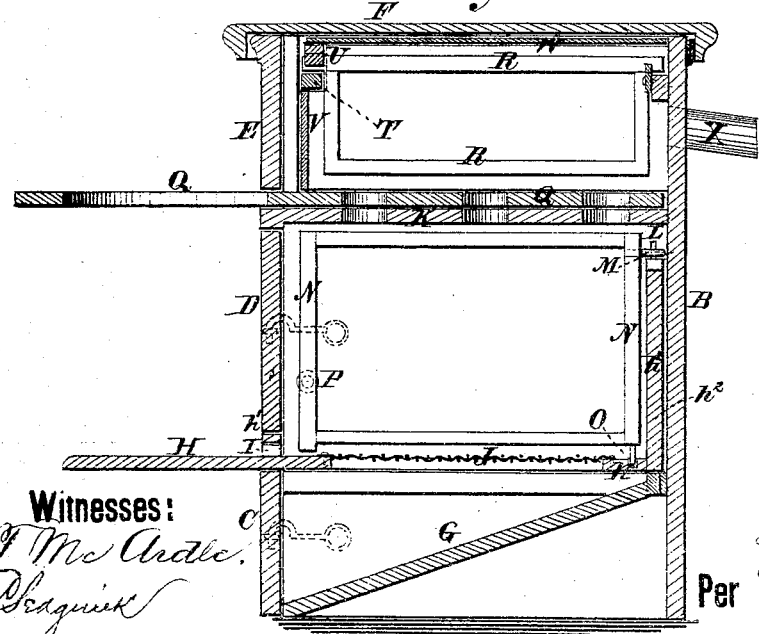

UNITED STATES PATENT OFFICE.

HYRAM F. BOBO AND PHILLIP F. JOHNSON, OF TREZEVANT, TENNESSEE.

IMPROVEMENT IN BEE-HIVES.

Specification forming part of Letters Patent No. 147,037, dated February 3, 1874; application filed October 18, 1873.

*To all whom it may concern:*

Be it known that we, HYRAM F. BOBO and PHILLIP F. JOHNSON, of Trezevant, in the county of Carroll and State of Tennessee, have invented a new and useful Improvement in Bee-Hives, of which the following is a specification:

Figure 1 is a front view of our improved bee-hive, the top or cover being raised and the doors all opened. Fig. 2 is a vertical section of the same.

Similar letters of reference indicate corresponding parts.

The invention will first be fully described, and then pointed out in the claims.

A are the sides, and B is the back, of the hive, which parts are made close, and are firmly connected together at their adjacent edges. The front of the hive is formed of three doors, C D E, which are hinged to the forward edge of one of the sides A, and are secured when closed to the forward edge of the other side by hooks and eyes or other convenient fastenings. The top or cover F is hinged at its rear edge to the upper edge of the back B, and is made with a downwardly-projecting flange around its edge, which overlaps the upper edges of the back B, sides A, and upper door E, as shown in the drawings, and which may serve as a fastening to hold the upper door E shut. G is the bottom of hive, which inclines upward from the lower edge of the lower door C to the back B at the rear edge of the sliding bottom H, and which is made of such an inclination that the refuse matter from the hive may slide down it and be conveniently swept out. The bottom H slides in and out upon cleats I, attached to the sides A, and its forward part projects in front of the hive, to serve as a platform for the bees to alight upon, and as a handle for drawing out and pushing in said bottom. Upon the upper side of the forward part of the bottom H, and in line with the doors when closed, is attached a narrow board, $h^1$, through which is formed the opening I, for the bees to pass in and out. The middle part of the sliding bottom H is cut away, and the opening thus formed is covered with wire gauze J, which allows the droppings from the bees to pass through, keeps out the moths, and admits the air. To the upper side of the rear end of the bottom H is attached a board, $h^2$, which projects upward nearly to the horizontal partition K, that separates the brood-chamber from the honey-box. To the upper edge of the board $h^2$ are attached pins L, to receive the eyes M, attached to the upper part of the rear bar of the comb-frames N. To the lower rear corners of the comb-frames N are attached pins O, which enter holes in the rear part of the bottom H, as shown in Fig. 2. The comb-frames N are thus hinged to the upright board $h^2$ of the sliding bottom H, so that when the said bottom is drawn out the frames N may be swung aside to allow the comb of any particular frame to be examined. The forward ends of the frames N are kept at the proper distance apart, and from the sides A by small screws P or other stops attached to the sides of the front end bars of said frames. The brood-chamber is separated from the honey-box by the stationary partitions K and the sliding partition Q. The partitions K Q are perforated with holes corresponding in form and position, and of such a size as to allow the bees to pass through freely. The forward end of the board or partition Q projects, to serve as a handle for sliding it out and in, to close and open the passage-ways for the bees through the partitions K Q. The ends of the top bars of the comb-frame R of the honey-box project in front and rear, and the rear ends rest upon a cleat, S, attached to the back B, and are kept from lateral movement upon said cleat by resting in notches formed in said cleat, or in a plate attached to its forward side. The forward ends of the top bars of the frames R rest upon a bar, T, the ends of which rest in grooves formed in the sides A. The forward ends of the comb-frames R are kept at the proper distance apart by a notched bar, U, placed upon them, and the ends of which enter the same grooves as the ends of the bar T. The front of the honey-box is closed by a glass plate, V, the end edges of which enter grooves in the sides A. The inner side of the top edges of the sides A and back B are rabbeted to receive the edges of a glass plate, W, which covers the honey-box. The glass plates V W enable the progress of the honey-making to be inspected whenever desirable, without disturbing the bees. In the back B, opposite the honey-box, is formed one or more holes, in which are secured short outwardly-projecting tubes X, which act as ventilators, and also as egress-passages for the bees.

When honey is to be removed from the honey-box, the slide Q is adjusted to close the holes through the partition K and slide Q. A little smoke is then blown into the honey-box, which causes the bees to escape through the tubes X, the said bees again entering the hive through the passage I. The honey-box may then be opened and any desired part of the honey removed.

When it is desired to inspect the brood-chamber, the tubes X are closed and a little smoke is blown into the brood-chamber, causing the bees to pass up into the honey-box. The slide Q is then drawn out, closing the passages, and the brood-chamber may be opened and inspected without disturbing or being disturbed by the bees.

Having thus described our invention, we claim as new and desire to secure by Letters Patent—

1. The narrow board $h^1$ I, arranged on the forward part of sliding bottom H, and in line with the closed doors, as and for the purpose described.

2. A sliding bottom, H, provided with the board $h^2$, at right angles thereto, and combined with frames N, as and for the purpose set forth.

3. The notched bar U, combined with, and applied to space, the honey-frames, as set forth.

HYRAM F. BOBO.
PHILLIP F. JOHNSON.

Witnesses:
   W. P. McCracken,
   Wm. H. Blalock.